United States Patent [19]
Ollhaeuser

[11] Patent Number: 5,789,740
[45] Date of Patent: Aug. 4, 1998

[54] METHOD AND DEVICE FOR ELIMINATING INTERFERENCE SIGNALS IN A LIGHT BARRIER

[75] Inventor: Helmut Ollhaeuser, Bissingen/Teck, Germany

[73] Assignee: Leuze Electronic GmbH + Co., Owen/Teck, Germany

[21] Appl. No.: 776,533

[22] PCT Filed: May 9, 1996

[86] PCT No.: PCT/EP96/01975

§ 371 Date: Jan. 29, 1997

§ 102(e) Date: Jan. 29, 1997

[87] PCT Pub. No.: WO96/38742

PCT Pub. Date: Dec. 5, 1996

[30] Foreign Application Priority Data

May 30, 1995 [DE] Germany ............... 195 19 659.7

[51] Int. Cl.⁶ ............................................... G01V 9/04
[52] U.S. Cl. ................... 250/221; 250/214 R; 340/555
[58] Field of Search ............................. 250/221, 222.2, 250/223 B, 559.41, 214 R, 551; 340/555–557; 356/385, 386

[56] References Cited

U.S. PATENT DOCUMENTS

| | | |
|---|---|---|
| 4,549,086 | 10/1985 | Herzer ................... 250/559.24 |
| 4,642,455 | 2/1987 | Rodi et al. ................... 250/221 |
| 5,057,683 | 10/1991 | Fukuyama ................... 250/214 B |
| 5,250,801 | 10/1993 | Grozinger et al. ................... 250/223 B |

FOREIGN PATENT DOCUMENTS

| | | |
|---|---|---|
| 36 05 885 | 8/1987 | Germany. |
| 42 24 784 | 2/1994 | Germany. |
| 43 19 451 | 8/1994 | Germany. |
| 43 23 910 | 1/1995 | Germany. |

OTHER PUBLICATIONS

Patent Abstracts of Japan, vol. 9, No. 225, Sep. 11, 1985 & JP-A-60 084013 (Tateishi Denki KK), May 13, 1985.

Patent Abstracts of Japan, vol. 9, No. 225, Sep. 11, 1985 & JP-A-60 084012 (Tateishi Denki KK), May 13, 1985.

*Primary Examiner*—Que Le
*Attorney, Agent, or Firm*—Spencer & Frank

[57] ABSTRACT

A device and a method for eliminating interference signals in a light barrier. The device includes, having a transmitter, a receiver and an evaluation unit that is connected to the receiver. The transmitter periodically emits light pulse trains with a defined pulse length $T_P$ and a defined period length $T_r$. In the evaluation unit, the received signals present at the receiver are evaluated only during activation intervals that are limited in time. The length of the activation intervals depends on whether light pulses are recorded during these activation intervals.

8 Claims, 4 Drawing Sheets

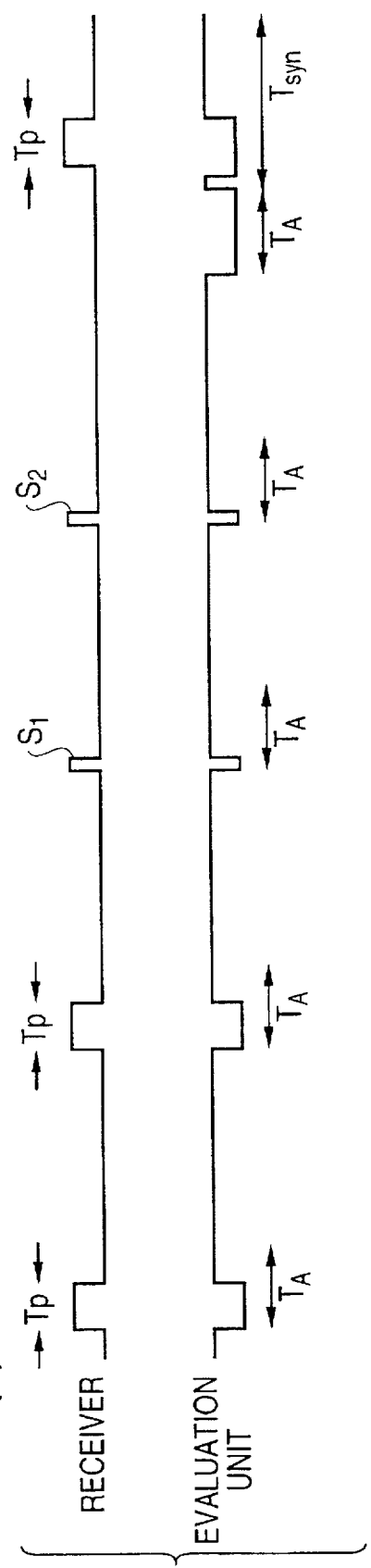

METHOD AND DEVICE FOR ELIMINATING INTERFERENCE SIGNALS IN A LIGHT BARRIER

BACKGROUND OF THE INVENTION

The invention concerns a method and a device for eliminating interference signals in a light barrier.

Such a light barrier is known from the German Patent DE-PS 43 23 910. The transmitter periodically emits light pulses with a defined pulse length and a subsequent transmitting break. A counter is connected following the receiver, in which the light pulses that arrive at the receiver are counted. The counter is connected to a multi-channel evaluation unit. Each channel has one output, which is directed to a logic unit.

Depending on the number of recorded light pulses, signal changes take place at the channel outputs for defined time intervals, which are processed in the logic unit such that a signal train with a defined pulse-break-ratio is present at its output. This signal train can be assigned clearly to the series of light pulses emitted by the transmitter. The pulse-break-ratio of the signal train is changed when internal or external interferences appear, which makes it possible to detect an interference.

Such a multi-channel evaluation of received signals is particularly suited for detecting internally occurring component errors with high certainty. This is of importance particularly if such light barriers are to be used in the field of personal security, where extremely high safety requirements must be met. The evaluation unit, which ensures the required safety, it correspondingly expensive.

SUMMARY OF THE INVENTION

It is the object of the invention to ensure a trouble-free operation of a light barrier of the aforementioned type.

The features in claim 1 are provided as solution. Advantageous embodiments and suitable modifications of the invention are described in the claims 2–8.

The invention at hand is based on the idea that the evaluation of the received signals is synchronous to the light pulses emitted by the transmitter.

The transmitter and the receiver of light barriers represent separate systems, which are arranged at a distance from each other. There is no connection via feed lines between these systems. A direct synchronization of transmitter and receiver via such a feed line is therefore on principle not possible.

In accordance with the invention, an evaluation unit is therefore connected to the receiver, which records the received signals present at the receiver output only during activation intervals that are limited in time. With trouble-free operation and clear beam path for the light barrier, the opening and closing of one of the activation intervals occurs synchronous to the light pulses periodically emitted by the transmitter, wherein the transmitting frequency is known and is preset as parameter in the evaluation unit. If individual transmitting light pulses are missing, for example when an object enters the beam path of the light barrier or if short interference pulses appear, this operational mode is interrupted and a second activation interval is opened, for which the maximum length corresponds to the period length of the transmitting light pulses.

The second activation interval is connected as soon as a light pulse is recorded in the evaluation unit within this scanning interval. If no light pulse is recorded, then the second activation interval is continuously opened and closed until the next light pulse is recorded. Following that, the first activation interval is opened periodically, in phase with the reception of the light pulses.

All interference pulses that appear asynchronous can be filtered out in a simple way through the synchronous operation of the light barrier. The synchronous operation can be interrupted only by briefly appearing interference pulses, which are recorded almost simultaneously with the light pulses emitted periodically by the transmitter.

However, by configuring the activation intervals in accordance with the invention, a new synchronization occurs quickly, which restores the error-free operation of the light barrier.

BRIEF DESCRIPTION OF THE DRAWINGS

The invention is explained in the following with the aid of the drawings. Shown are.

DETAILED DESCRIPTION OF THE INVENTION

Figure 1:
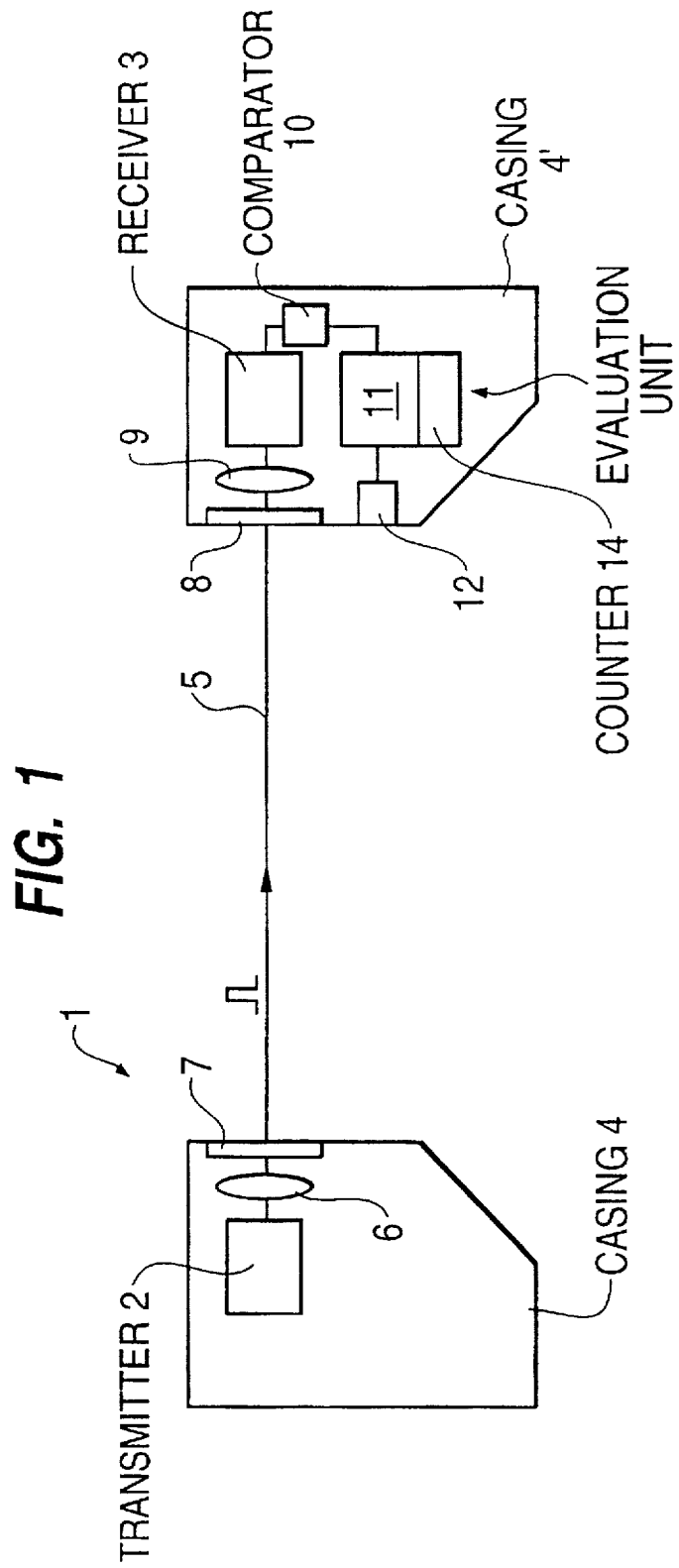
FIG. 1 A diagrammatic representation in partial block diagram, of the light barrier according to the invention.

FIG. 1 shows a light barrier 1 with a transmitter 2 and a receiver 3. The transmitter 2 and the receiver 3 are respectively integrated into a casing 4, 4', and are arranged at a distance to each other. The transmitter 2, which is for example formed by a light-emitting diode, emits transmitting light 5 in the form of light pulses. The transmitting light 5 is focused by a transmitting optic 6 that is connected following the transmitter 2 and penetrates an exit window 7, which is arranged in the wall of casing 4.

If the beam path between transmitter 2 and receiver 3 is clear, then the transmitting light 5 penetrates an exit window 8 in the wall of casing 4' and is focused via a receiving optic 9 onto the receiver 3.

The receiver 3 is designed as photodiode, for example, and converts the arriving light pulses into an electric signal train. These received signals are fed to a comparator 10, which filters out low-level interference signals. The output for comparator 10 is directed to an evaluation unit 11, which is designed as microcontroller in the case at hand.

The received signals present at the output of comparator 10 are read in via an input for the microcontroller. An interference signal generator 12 is connected to one microcontroller output.

The interference signal generator 12 is preferably designed as a light-emitting diode, which is integrated into the wall of the casing 4'.

The transmitter 2 emits periodic light pulses with a predetermined length $T_P$. The period length is $T_S$. The receiver 3, on the other hand, is operated continuously and converts the arriving light pulses continuously into electric signal trains. The read-in received signals are evaluated in the evaluation unit 11. For the exemplary embodiment at hand, the corresponding evaluation logic is designed as a computer program that is implemented on the microcontroller. Alternatively, the evaluation unit 11 can also be formed by a hardware circuit.

The received signals are evaluated in the evaluation unit 11 in such a way that the received signals are not recorded continuously, but only for a limited time during defined activation intervals. Such an activation interval can be opened or closed by assigning the value one or zero to a specific binary variable (flag).

Such a flag is coordinated with each activation interval. For the example at hand, the activation interval is opened only if the respective flag assumes the value one.

Figure 2:
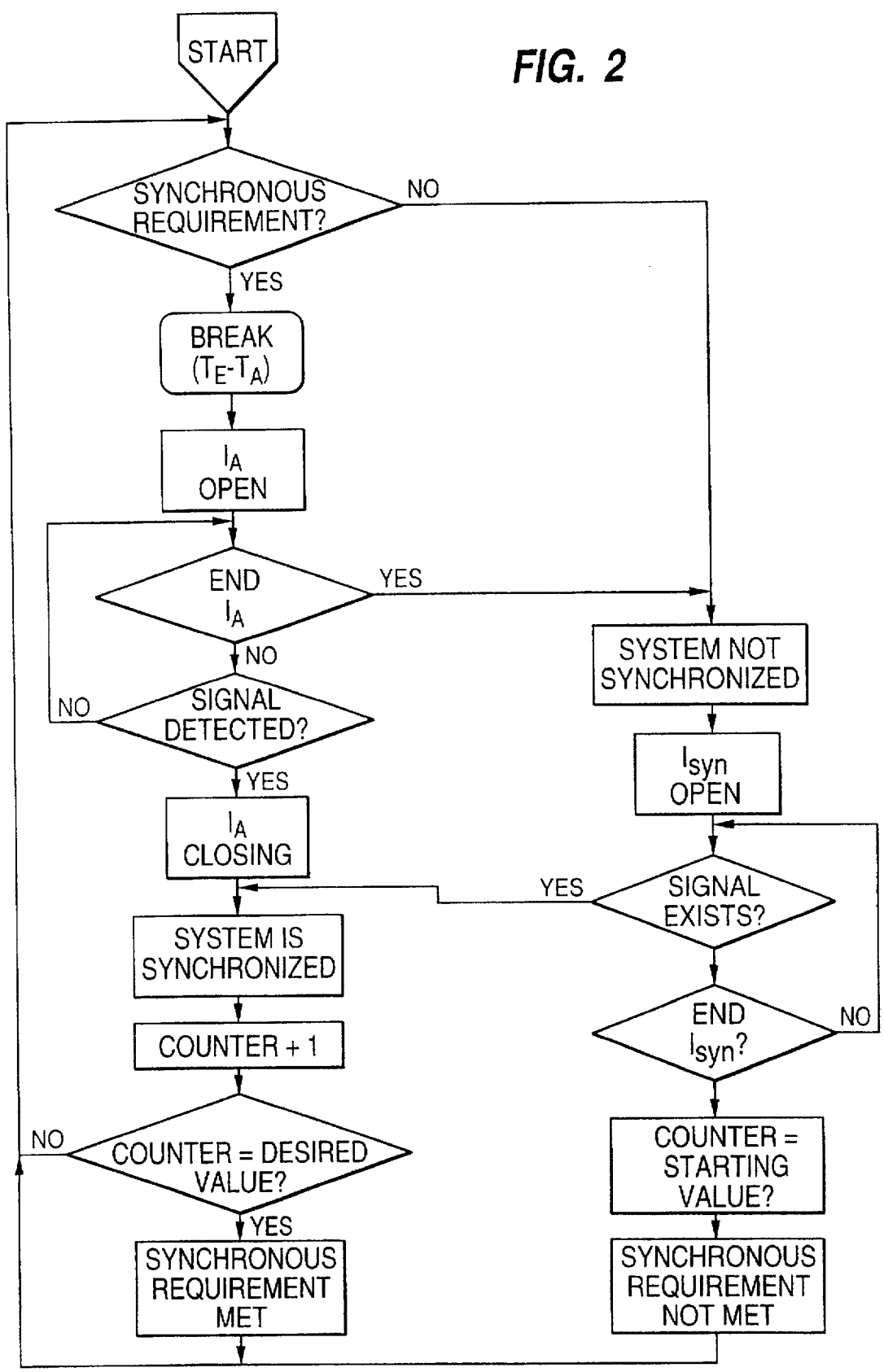
FIG. 2 Flow diagram of the evaluation sequence in the evaluation unit.

The evaluation of the received signals can be seen in the flow diagram in FIG. 2. The light pulses are periodically emitted by the transmitter 2 with the period length of $T_S$. The pulse length for a light pulse is $T_P$. These parameters are known and are used in the receiver 3 for dimensioning the individual activation intervals.

The circuit closing for light barrier 1 is characterized in the flow diagram with "start." The circuit closing is completed as soon as a first light pulse is recorded in the evaluation unit 11.

An interrogation occurs during a first step to determine whether the synchronous requirement has been met. It is not possible that this requirement has been met after detecting the first light pulse, since at least two successive light pulses must be recorded for this.

Depending on whether this synchronous requirement has been met, the flow diagram branches into two different branches.

The case where the synchronous requirement has been met is dealt with first. Subsequently, a break with defined length is then triggered in the evaluation unit 11. The length of this break is constant, meaning it does not depend on outside influences such as, for example, the receiving of a light pulse. No light pulses are recorded during this break.

Subsequently, the activation interval $I_A$ is opened. The maximum length for this activation interval $I_A$ is $T_A$, wherein $T_A$ is slightly longer than the pulse length $T_P$. The preceding break during which no transmitting pulse are emitted is $T_E-T_A$, wherein $T_E$ is the period length with which the activation interval $I_A$ is opened or closed during the synchronous operation of transmitter 2 and receiver 3.

An interrogation determining the end of the activation interval $I_A$ occurs in the microcontroller (end $I_A$?). Subsequently, the interrogation for "signal detected" takes place, meaning an interrogation occurs to determine whether a light pulse has been recorded within the activation interval $I_A$.

The period length $T_E$ on the one hand is considerably longer than $T_A$. On the other hand, the period length $T_E$ is equal to or only slightly longer than the period length $T_S$, with which the transmitter 2 periodically emits the light pulses.

The extent of the period length $T_E$ depends on whether the activation interval $I_A$ is completely traversed or whether it is closed prematurely following the recording of a light pulse. In the first case, the period length $T_E$ is selected such that $T_E$ is slightly longer than $T_S$. The difference $T_E-T_S$ essentially contains the internal transit times through the switching and delay times for the structural components on the receiving side as well as a slight increase, which takes into account possibly existing component variances.

If the operation for the transmitter 2 and the receiver 3 is synchronized, a light pulse must be recorded within $T_A$ as a result. The appearance of this light pulse is continuously interrogated following the return after the interrogation "signal detected" until the activation interval $I_A$ is closed. If no light pulse has been recorded during the activation interval $I_A$, the operation is not synchronized and a branching off to the right branch of the flow diagram occurs.

If, on the other hand, a light pulse is detected, the activation interval $I_A$ is closed immediately thereafter, that is before the completion of time $T_A$ ($I_A$ closing).

Thus the operation of the "system" (FIG. 2) comprising transmitter 2, receiver 3 and the evaluation unit 11 is synchronous. As a result, the count value of a counter 14, for example, in the evaluation unit 11, is increased by one. The count value is a measure of the degree of synchronization of the system. The higher the count, the more light pulses were recorded during the synchronous operation. It has proven advantageous and sufficient to select the value two as the desired value for the count. It means that sufficient synchronization exists with two light pulses already, which are received successively during the synchronous operation.

If the synchronous requirement is met, a corresponding control variable is applied to the value one. The control variable is again interrogated at the start of the next interrogation period. As long as the control variable assumes the value one, the interference signal generator 12 that is connected to the microcontroller is kept in the off-state, meaning no interference message is issued because the operation is synchronized.

The right branch of the flow diagram is traversed if the "operation of the system is not synchronous." This is the case immediately after the light barrier 1 becomes operational or if no light pulse is recorded within the activation interval $I_A$.

In that case, a second activation interval $I_{SYN}$ is opened. The length of this activation interval $T_{SYN}$ is maximum $T_S$. A continuous interrogation occurs during this time interval to determine whether a "signal exists," meaning whether a light pulse was recorded. As soon as a light pulse is recorded, the activation interval $I_{SYN}$ is closed.

With the detection of the light pulse, the system is again synchronous and a branching off occurs in the left branch of the flow diagram.

If no light pulse is recorded during the activation interval $I_{SYN}$ then the system does not have a synchronous operation. Consequently, the counter is reset to its starting value, which is one for the exemplary embodiment at hand.

Subsequently, the control variable for the synchronous requirement is set to the value zero (no synchronous operation), which leads to an interference message by the interference signal generator 12.

Subsequently, there is a return to the start of the flow diagram, whereupon an interrogation for the synchronous requirement occurs. Since this requirement is not met, the activation interval $I_{SYN}$ is opened again.

Figure 3A:
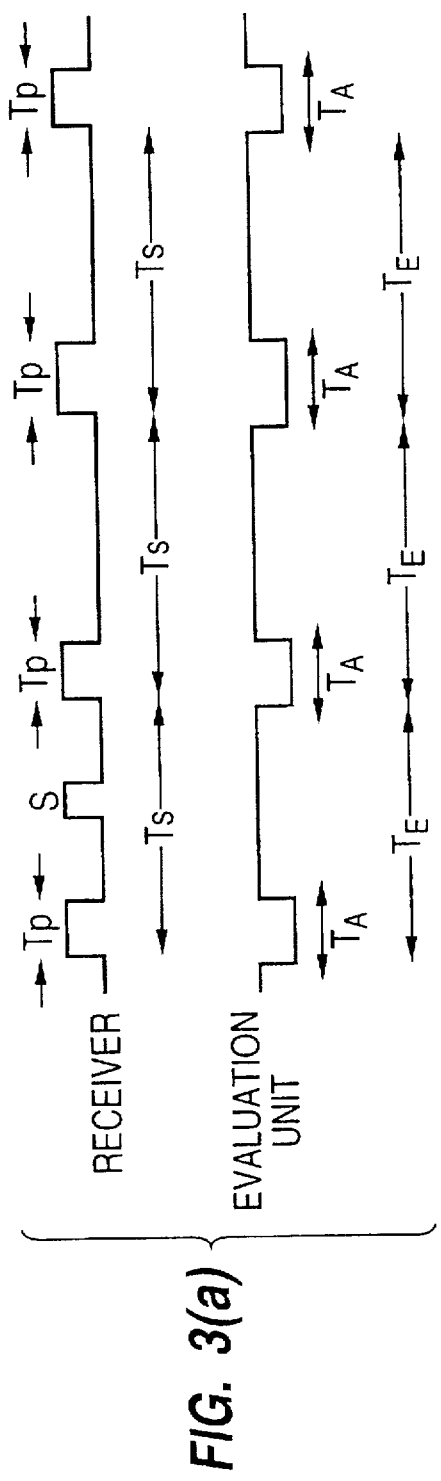
FIGS. 3(A–C) Pulse diagram of the German Patent light pulses emitted by the transmitter and the light pulses recorded in the evaluation unit a) synchronous operation during clear beam path, b) operation with interruption of the beam path, c) operation with interference of the synchronous operation.
Figure 3B:
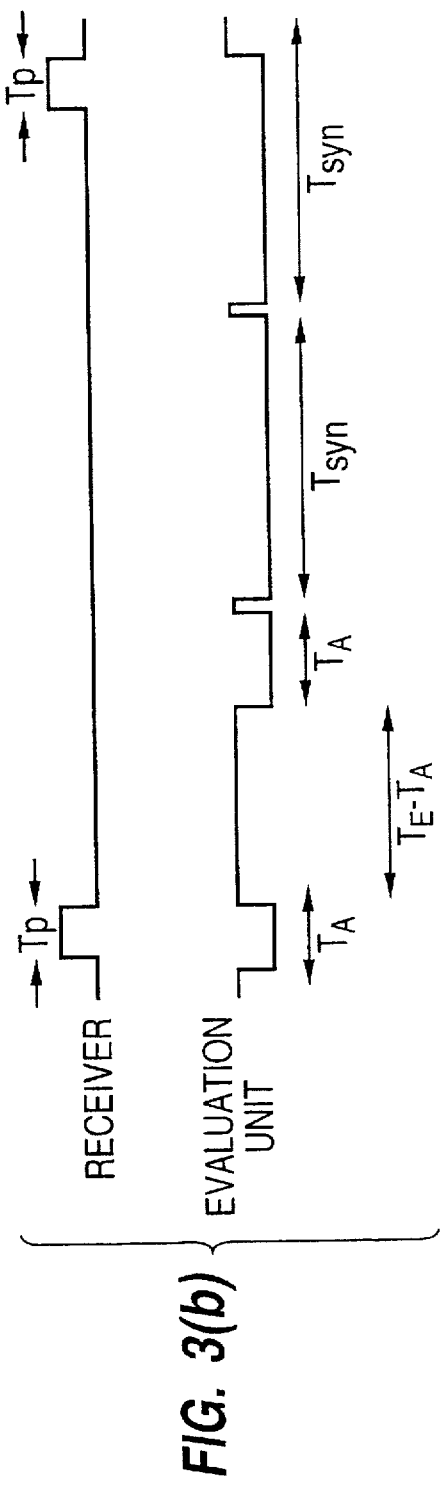

The operation of the light barrier 1 according to the invention can be seen, in particular in the pulse diagrams shown in FIGS. 3a, 3b, 3c.

FIG. 3a shows the synchronous, error-free operation of the light barrier 1 with clear beam path. The light pulses with pulse length $T_P$ and period length $T_S$, which are emitted periodically by the transmitter 2, arrive continuously at the receiver 3. During the synchronous operation, the left branch of the flow diagram shown in FIG. 2 is continuously traversed in the evaluation unit 11. During a break with the constant length $T_E-T_A$, no light pulses are recorded in the evaluation unit 11. Asynchronously occurring interference pulses S are consequently blanked in the evaluation unit 11, which considerably reduces the sensitivity to interference of the light barrier 1.

The activation interval $I_A$ is opened following completion of the break. The length of the activation interval is $T_A$ and is slightly longer than the pulse length $T_P$. The value for the break $T_E-T_A$ is selected such that the period length $T_E$ is slightly longer than the period length $T_S$ if the activation interval $I_A$ is traversed completely. As a result of that, the light pulse emitted by the transmitter falls with certainty into the activation interval $I_A$.

As soon as the light pulse has been recorded, the activation interval $I_A$ is closed and a break $T_E-T_A$ is activated anew. This process is repeated continuously for an error-free operation of the light barrier 1. The period length $T_E$ here becomes equal to the period length $T_S$ of the transmitter 2 because of the premature completion of the activation interval $I_A$. This means that the operation of transmitter 2 and that of evaluation unit 11 on the receiving side is completely synchronized.

FIG. 3b shows the case where the beam path of the light barrier 1 is interrupted briefly by an object intervention. The object interrupts the beam path only briefly, so that two successive light pulses emitted by the transmitter 2 do not arrive at the receiver 3.

When the first light pulse arrives at the receiver 3, the operation of light barrier 1 is still synchronous, as previously described in FIG. 3a. Correspondingly, the light pulse is detected during the activation interval $I_A$, whereupon a break with length $T_E-T_A$ follows. Subsequently, the activation interval $I_A$ is opened anew. However, no light pulse is recorded during the time interval $T_A$.

Thus, the operation of the light barrier is no longer synchronous, whereupon a branching occurs in the right branch of the flow diagram shown in FIG. 2. Immediately after closing the activation interval $I_A$, a second activation interval $I_{SYN}$ is opened. The length of the activation interval $I_{SYN}$ is $T_{SYN}$, for which the maximum length is equal to the period length $T_S$.

Within this activation interval $I_{SYN}$, there is a continuous interrogation to determine whether a light pulse has arrived at the receiver 3. For the case shown in FIG. 3b, no light pulse arrives at the receiver 3 during the first activation interval $I_{SYN}$. Consequently, the counter in the evaluation unit 11 is set to its initial value and the activation interval $I_{SYN}$ is subsequently opened again.

During the second activation interval $I_{SYN}$, a light pulse emitted by the transmitter 2 arrives at the receiver 3. Immediately after this light pulse has been recorded in the evaluation unit 11, the activation interval $I_{SYN}$ is closed prematurely, the count is raised by one, which results in the desired value two for the counter.

The operation of the light barrier 1 thus is once more synchronous. The further evaluation therefore takes place in the evaluation unit 11, in accordance with the left branch of the flow diagram in FIG. 2.

It is crucial that the maximum length $T_{SYN}$ of the activation interval $I_{SYN}$ is equal to the period length $T_S$ of the light pulse emitted by the transmitter 2. If the beam path is interrupted for several period lengths $T_S$, then, after several light pulses arrive at the receiver 3, an interrogation occurs in the evaluation unit 11, in phase with the light pulses emitted by the transmitter 2. As a result of this, an initially existing synchronization in the evaluation unit 11 is carried along as parameter, so that following the detection of light pulses from the transmitter 2, a synchronous operation exists once more immediately after a longer break. However, if an asynchronous interference pulse arrives at the receiver 3 after a longer break, it is possible a false synchronizing occurs briefly following this interference pulse. However, this error is recognized immediately because the succeeding light pulses emitted by the transmitter 2 are not synchronized with this interference pulse.

FIG. 3c shows the case where the beam path is interrupted briefly through an object intervention. The length of this interruption amounts to twice the period length $T_S$. During the interruption interval, two short-term interference pulses $S_1$, $S_2$ arrive at the receiver 3. The interference pulses $S_1$, $S_2$ here arrive at the receiver 3 nearly in phase with the light pulses emitted by the transmitter 2. However, they arrive at the receiver 3 a bit earlier than a regular light pulse. In addition, their pulse length is considerably shorter than the pulse length $T_P$ of a light pulse emitted by the transmitter 2.

The two first light pulses arriving at the receiver 3 according to FIG. 3c are regular light pulses emitted by the transmitter 2. These light pulses are evaluated in the evaluation unit 11, wherein transit is through the left branch of the flow diagram in FIG. 2, meaning the operation of the light barrier 1 is synchronous.

Following recording of the second light pulse, the activation interval $I_A$ is opened anew after a break with length $T_E-T_A$. The first interference pulse S1 recorded by the evaluation unit 11 falls in this activation interval $I_A$. Even though the interference pulse occurs somewhat earlier as compared to a light pulse emitted by the transmitter 2 and also has a shorter pulse length than it, the interference pulse $S_1$ is not detected as interference since it falls into the activation interval $I_A$, corresponding to a synchronous operation of the light barrier 1. The synchronous operation of the light barrier 1 is consequently maintained and the second light pulse $S_2$ is evaluated in the same way.

As a result of receiving the interference pulses, the activation interval $I_A$ is closed prematurely, and the period length $T_E$ is shortened enough so that after the beam interruption is completed, the light pulse that travels from the transmitter 2 to the receiver 3 no longer fall into the activation interval $I_A$, which was opened following the recording of $S_2$. The activation interval $I_A$ is closed before the light pulse arrives at the receiver 3. Consequently, the synchronizing of the light barrier 1 is interrupted by the arrival of the nearly resonant interference pulses $S_1$, $S_2$.

In that case and following the closing of activation interval $I_A$, a branching occurs in the evaluation unit 11 to the right branch of the flow diagram and the activation interval $I_{SYN}$ is opened. During this interval, the light pulse emitted by the transmitter 2 is detected, whereupon the count on the counter is raised by one. Thus, the operation is synchronous once more and the left branch of the flow diagram is traversed. The error-free operation of light barrier 1 is thus restored.

The exemplary embodiments shown in FIGS. 3a, 3b and 3c illustrate that the synchronous operation of the light barrier 1 is maintained even during beam interruptions and interference radiation, which are nearly resonant with the light pulses emitted by the transmitter.

Asynchronous interference signals are suppressed completely by the inventive light barrier 1. In addition, a nearly resonant interference radiation can be eliminated almost completely.

I claim:

1. A method for eliminating interference signals in a light barrier, wherein the light barrier includes a transmitter periodically emitting trains of light pulses with a defined pulse, length $T_P$ and a defined period length $T_S$, a receiver disposed for detecting light pulses emitted by the transmitter and presenting received signals at an output of the receiver representing the received light pulses, and an evaluation unit connected to the receiver for recording the received signals, wherein the evaluation unit performs steps including:

> periodically opening an activation interval $I_A$ having a variable length $T_A$ and a period length $T_E$, wherein the activation interval length $T_A$ has a maximum length defined by:
>
> $T_A > T_P$ and $T_A < T_S$ and $T_A < T_E$;
>
> recording received signals present at an output of the receiver in the evaluation unit during the activation interval $I_A$;
>
> continuously repeating the step of periodically opening the activation interval $I_A$ as long as a light pulse is recorded during the activation interval $I_A$;
>
> closing the activation interval $I_A$ prematurely, immediately after recording the light pulse in the evaluation unit, wherein the period length $T_E$ is equal to or slightly longer than the period length $T_S$;
>
> opening the activation interval $I_{SYN}$ if a light pulse is not detected during the activation interval $I_A$ wherein the activation interval $I_{SYN}$ has a maximum length $T_{SYN}$ equal to $T_S$;
>
> repeating the opening of the activation interval $I_{SYN}$ until a light pulse is recorded during the activation interval $I_{SYN}$; and
>
> closing the activation interval $I_{SYN}$ immediately after recording the light pulse during the activation interval $I_{SYN}$ and then opening the activation interval $I_A$ with the period length $T_E$.

2. The method according to claim 1, further including increasing a value of a count following detection of a light pulse within one of the activation intervals $I_A$ and $I_{SYN}$, wherein reaching a predetermined desired value for the count represents a synchronous state for a synchronous operation of the transmitter and for the evaluation of the received signals in the evaluation unit.

3. The method according to claim 2, including respectively increasing the count by a value of one and selecting a value of two for the desired value.

4. The method according to claim 2, wherein the continuously repeating step includes continuously opening the activation interval $I_A$ with the period length $T_E$ as long as there is synchronous operation.

5. The method according to one of claim 1, wherein the step of opening the activation interval $I_{SYN}$ includes opening the activation interval $I_{SYN}$ immediately after closing the activation interval $I_A$.

6. In a light barrier device for implementing a method for eliminating interference signals in the light barrier, wherein the light barrier includes a transmitter periodically emitting trains of light pulses with a defined pulse length $T_P$ and a defined period, length $T_S$, a receiver disposed for detecting light pulses emitted by the transmitter and presenting received signals at an output of the receiver representing the received light pulses, and an evaluation unit connected to the receiver for recording the received signals, wherein the evaluation unit includes:

> means for periodically opening an activation interval $I_A$ having a variable length $T_A$ and a period length $T_E$, wherein the activation interval length $T_A$ has a maximum length defined by:
>
> $T_A > T_P$ and $T_A < T_S$ and $T_A < T_E$;
>
> means for recording received signals present at an output of the receiver in the evaluation unit during the activation interval $I_A$;
>
> means for continuously repeating the step of periodically opening the activation interval $I_A$ as long as a light pulse is recorded during the activation interval $I_A$;
>
> means for closing the activation interval $I_A$ prematurely, immediately after recording the light pulse in the evaluation unit, wherein the period length $T_E$ is equal to or slightly longer than the period length $T_S$;
>
> means for opening the activation interval $I_{SYN}$ if a light pulse is not detected during the activation interval $I_A$, wherein the activation interval $I_{SYN}$ has a maximum length $T_{SYN}$ equal to $T_S$;
>
> means for repeating the opening of the activation interval $I_{SYN}$ until a light pulse is recorded during the activation interval $I_{SYN}$; and
>
> means for closing the activation interval $I_{SYN}$, immediately after recording the light pulse during the activation interval $I_{SYN}$ and then opening the activation interval $I_A$ within the period length $T_E$; and
>
> the light barrier device further includes separate casings into which the transmitter and the receiver are respectively integrated and the evaluation unit comprises a micro-controller that is integrated into the casing of the receiver.

7. The device according to claim 6, and further including a comparator connected between the receiver and the micro-controller, wherein received signals present at an output of the receiver are fed via the comparator to an input of the micro-controller.

8. The device according to claim 6, wherein the micro-controller increases a value of a count following detection of a light pulse within one of the activation intervals $I_A$ and $I_{SYN}$ wherein reaching a predetermined desired value for the count represents a synchronous state for a synchronous operation of the transmitter and for the evaluation of the received signals in the evaluation unit, and the device further includes an interference signal generator disposed at the casing of the receiver for emitting an interference signal when the predetermined count has not been reached thereby indicating that synchronous operation has not been established.

* * * * *